(12) United States Patent
Von Laffert-Kobylinski et al.

(10) Patent No.: US 8,486,614 B2
(45) Date of Patent: Jul. 16, 2013

(54) DEVICE AND METHOD FOR EXPOSING A PHOTO MATERIAL

(75) Inventors: Felix Von Laffert-Kobylinski, Kiel (DE); Wolfgang J. Riedel, Muhlheim (DE)

(73) Assignee: Realeyes GmbH, Kiel (DE)

( * ) Notice: Subject to any disclaimer, the term of this patent is extended or adjusted under 35 U.S.C. 154(b) by 107 days.

(21) Appl. No.: 12/865,586

(22) PCT Filed: Dec. 17, 2008

(86) PCT No.: PCT/EP2008/067732
§ 371 (c)(1),
(2), (4) Date: Jul. 30, 2010

(87) PCT Pub. No.: WO2009/097939
PCT Pub. Date: Aug. 13, 2009

(65) Prior Publication Data
US 2010/0310992 A1   Dec. 9, 2010

(30) Foreign Application Priority Data

Feb. 8, 2008   (DE) .......................... 10 2008 008 232

(51) Int. Cl.
*G03F 7/26* (2006.01)
(52) U.S. Cl.
USPC ........................................ 430/397; 430/322
(58) Field of Classification Search
USPC ................................................ 430/322, 397
See application file for complete search history.

(56) References Cited

U.S. PATENT DOCUMENTS

| 5,279,912 A | * | 1/1994 | Telfer et al. ..................... 430/17 |
| 5,953,103 A | | 9/1999 | Nakamura |
| 2003/0038930 A1 | | 2/2003 | Sumii |
| 2004/0141166 A1 | | 7/2004 | Bleeker et al. |
| 2005/0052708 A1 | | 3/2005 | Shimoyama |
| 2007/0153080 A1 | * | 7/2007 | Oehlbeck et al. ............. 347/224 |
| 2007/0162781 A1 | | 7/2007 | Visser et al. |

FOREIGN PATENT DOCUMENTS

| EP | 0002736 | 7/1979 |
| EP | 0996022 | 4/2000 |
| GB | 2312349 | 10/1997 |

* cited by examiner

*Primary Examiner* — Kathleen Duda
*Assistant Examiner* — Caleen Sullivan
(74) *Attorney, Agent, or Firm* — Sand & Sebolt

(57) ABSTRACT

The invention relates to a method and an imagesetter by means of which a photo material comprising a plurality of zones to be exposed individually, such as hundreds of thousands of such zones, can be done in an economical manner and particularly in acceptable exposure times. To this end, a method is provided for exposing a photo material comprising a plurality of zones to be exposed, preferably disposed regularly, particularly line by line, and having a digitally derived image, by means of which method a continuous relative motion is carried out between the photo material and the imagesetter, and the exposition of the individual zones takes place during said motion.

12 Claims, 3 Drawing Sheets

DEVICE AND METHOD FOR EXPOSING A PHOTO MATERIAL

TECHNICAL AREA

The invention concerns a method for exposing a photo material that features a plurality of zones that are preferably regularly, particularly row-wise, disposed to be exposed individually with a digitally derived image by means of an image setter. It furthermore concerns an image setter for exposing a photo material that features a plurality of zones that are preferably regularly, particularly row-wise, disposed to be exposed individually with a digitally derived image.

PRIOR ART

In theory, as well as also in the published state of the art, photo systems are described that seek to evoke a three-dimensional image impression by means of placing a lens array on a photo material. For that purpose an image of the object to be represented is produced on the photo paper through each lens of the array, during the rendition the image is then observed through the lens array, so that the observer can simultaneously perceive images from different observation angles and insofar the three-dimensional impression is created. An example of this technology is described in WO 2005/022255.

Even if the considerations concerning the photo material itself have progressed significantly already, there are presently no technical conceptions regarding the means and the ways by which such a photo material is to be exposed and thereby to be provided with the images that are to be rendered three-dimensionally. One problem in particular is due to the fact that—primarily but not entirely in the case of digitally generated images—an image setter has to be driven, for the generation of each image to be recorded through the individual lens of the array, in front of that lens and has to generate the corresponding image there. In the case of a number of readily several hundred thousand individual lenses this means a plurality of individual exposures and a correspondingly elaborate process procedure.
In order to design this in an economical manner, a corresponding rational method has to be created and a suitable device for the implementation of this method has to be indicated that permits a correspondingly quick implementation of the exposure process.

DISCLOSURE OF THE INVENTION

To create this method or such a device is the aim of the invention described here, whereby the device and the method so created are not solely designed for the exposure of a photosensitive device that is coated with a lens array, as indicated in WO 2005/022255, but can be deployed fundamentally for a rational and economical exposure of a photo material with a plurality of zones that are to be exposed individually.

This problem is solved on the one hand by means of the method of the present invention, on the other by means of an image setter in accordance with the present invention.

The thought essential to the invention is to guide the image setter relative to the surface of the photo material in a continuous motion and to at the same time perform the exposure of the individual cells. In this context it is of course important that the cells are exposed in a target-oriented manner and separately and a neighboring cell that is to be exposed later with other image information is not possibly already exposed during the continuous motion of the image setter with the light intended for the previous cell. Fundamentally it is thereby not important whether the image setter is shifted actively relative to the photo material or the photo material is guided along underneath the fixed image setter or even if a motion of both indicated components, the image setter as well as the photo material, occurs. In practice one will however, in particular in the case of large-area photo material, move the image setter across resting photo material.

Due to the fact that image setter and photo material move continuously relative to each other, the position between image setter and photo material does not have to be newly adjusted for each exposure, which is especially time consuming because of the pickup of the movement and braking and the exact positioning. This expenditure of time that adds up over the course of a plurality of zones, for example one hundred thousand and more, is significant and exceeds the exposure times for the individual zones usually clearly.

In order to avoid stray light and incorrect exposures it is of an advantage to sharply limit the area of the light emanating from the image setter where it is to impinge, preferably within the photo material that is to be exposed or in the plane of the entrance pupil of the photo material that is to be exposed. For this purpose a pupil can be imaged in order to create an exit pupil that is located outside of the image setter.

This continuous motion with simultaneous location-accurate exposure can on the one hand be accomplished in such a manner that the exposure time stays markedly below the duration of motion from a first zone to be exposed to a neighboring, second zone to be exposed. In this context exposure times below 0.1 seconds, in particular in the range of a few milliseconds, are preferred in order to assure a fast exposure of the entire photo material. Of course even shorter exposure times in the range of picoseconds or even shorter are conceivable as long as a sufficient amount of light still reaches the individual zones for an exposure appropriate to the requirements.

In a different approach care can be taken to avoid erroneous exposure of a different zone than the zone to be exposed in that the output pupil of the image setter moves along the image setter also relatively and therefore, at least for the duration of the exposure time, remains at rest relative to the photo material. The exit pupil can thereby be an actual aperture or a projected aperture external to or at the exit of the image setter.

If one proceeds according to this variation of the invention or with a correspondingly designed image setter according to the invention the image setter moves relative to the photo material or the photo material moves beneath the image setter already during the exposure of a previous zone in the direction of the next zone, only the usually very small and therefore quick to move exit pupil of the image setter has to then follow and moves during the exposure of the following cell again relatively to the image setter housing or along the image setter. By these means a substantial savings in dead times, where nothing happens except a shunting of the image setter relative to the photo material, can be achieved, as a result of which the entire required time for the exposure of the entire photo material is lowered to an economically reasonable measure.

In this variation the exit pupil of the image setter should correspond in its aperture width essentially to the entrance pupil of the zones, preferably however exceed these or deviate below them slightly. By these means it then namely assured that even in the case of a minor relative motion or misalignment between the exit pupil and the photo material during the forward motion of the image setter the zone to be exposed is exposed with a defined amount of light. A relation as described above between the exit pupil of the image setter and the entrance pupil of the zones is thereby also of an advantage for the previously mentioned implementation of the method with short exposure time.

A particularly simple method by means of which the exit pupil that is positioned on the outside can be moved relative to the image setter is to move the pupil essentially linearly within the image setter at least for the duration of an exposure time. In this context deviations from the linearity of up to 30° are tolerable without significant losses. Such deviation appear for example in the case when the pupil is moved on a circular section whose diameter is however large enough to make a corresponding approximation to a linear motion possible.

In order to avoid poor positioning between image setter and photo material preferably no vibrations should be transmitted.

This can be achieved through the avoidance of imbalances and mass accelerations. Imbalances can be avoided if solids of revolution disposed within the image setter are, in regard to their mass distribution and disposition of the rotational axis, correspondingly constructed. The rotation axis should thereby coincide with one of the main axes of inertia of the solid of revolution and run through the center of gravity of the solid of revolution. Imbalances and mass accelerations can be avoided for example by the relevant components having the least possible mass (are light).

In the calculation of the optical system one should take care to define a whole aperture in which the partial aperture, the moved pupil, is disposed and to optimize the ray progression for this whole aperture. Hereby it is assured that the quality of the optical image is made relatively independent of the position of the moved pupil within the whole aperture.

Particularly simple is the implementation of the method according to the second variation when the image setter performs an imaging with light rays that carry the image information, imaged at infinity, and that are essentially parallel with the plane of the exit pupil. Then namely, in the context of the method of the image setter relative to the photo material, the tracing of these light rays does not have to be implemented with a complex construction in the image setter.

The imaging of the image information at infinity can thereby purposefully occur with plus or minus 1 diopter of deviation. By these means possibly present imaging flaws of the zones to be exposed can be evened out. A deviation of significantly more than 1 diopter is usually not sensible because in that case the rays carrying the image information are anti-parallel to such a degree that during the exposure in the interplay of the relative movement between the photo material and the image setter a new source of defocus is created.

Even if, as was discussed at the beginning, the method and the image setter according to the invention can in principle be used for the exposure of any photo material that is compartmentalized into different zones irrespective of whatever guidelines, the invention is still preferably applied to the exposure of a light-sensitive film, which is covered-over with a lens array, as a photo material.

In order to generate an image with a three-dimensional effect, the image setter should expose different zones with images from shifted observation angles during the exposure process. These images are typically calculated by a digital image processor unit, if necessary, intermittently stored and then entered into the image setter in a synchronized manner. The calculation of the images and the synchronized entering into the image setter can thereby occur spatially and temporally staggered. By these means the images can be calculated for example in a computer center or such like (if necessary also already subject to the calculation of concrete control data for the image setter that is based on these image data) and to then be passed, by means of a storage medium for example a CD-ROM, a DVD or such like, or online, to the image setter.

Basically it is thereby possible that with the method according to the invention neighboring zones are exposed with different colors, whereby these should form the three primary colors of a color mixing system. Depending on a later rendition (either based on the type of a slide or based on a type of print) the primary colors of the additive or subtractive mixing system can be utilized. By these means the information from three neighboring zone would then evoke a multi-colored image in the eye of the observer. Similarly a zone can be sequentially exposed with the primary colors of a color mixing system in order to, by these means, imprint the color image information across the entire width of the spectrum in one zone.

An image setter according to the invention for the exposure of a plurality of preferably regularly, particularly row-wise, arranged zones, which are to be individually exposed, of a photo material with a digitally calculated image, features in an image setter unit an image generation unit and a pupil, whereby the image setter unit is equipped for the automated method relative to the photo material to be exposed and whereby the pupil is, controlled in its position, modifiable relative to the image setter unit in such a way that its image, the exit pupil during a process of the image setter unit relative to the photo material remains essentially stationary in relation to the photo material, at least for the duration of the exposure time. Thereby an in-focus image can be realized. Deviations in the fixed location during the exposure time, meaning motions within the exposure time, are however tolerable up to maximally ¼ of the mean zone separation without significant quality or in-focus losses A possible implementation of the exit pupil that can be shunted relative to the image setter or its housing. In the case of a rotating disk that features an elongated opening that runs at an oblique angle to a light entry slot and where its rotational velocity is correlated with the feed velocity of the image setter relative to the photo material, one can very easily generate a movement of the exit pupil relative to the image setter that as a rule will run opposite the direction of movement of the image setter relative to the photo material.

By means of the disposition of the disk with its rotational axis on the longitudinal axis of the light entry slot and the spiral-shaped disposition of the opening of the disk the rotational movement of the disk results in a linear progression of the pupil that is formed by the overlap of the longitudinal slot and the opening in the rotational disk along the longitudinal slot. On the disk two of such spiral-shaped implemented opening can be disposed through which then sequentially exposures of two neighboring zones are accomplished. Between the openings on the disk are disposed preferably angular ranges without opening which establish for the image setter times without exposure during the operation.

Alternatively it is also conceivable to dispose instead of a longitudinal opening on an analogously arranged, rotating disk a plurality of preferably essentially circularly shaped or similarly formed openings that are guided during the rotation of the disk across a corresponding light entry opening that also extends at least also along the movement direction of the openings of the disk. Instead of a rotating disk a punched tape can then also be guided across an opening in order to form the exit pupil that is moving relative to the housing.

The image generation unit in the image setter can for example be equipped with light-emitting diodes (LEDs), preferably in the primary colors red, green and blue. With these, by means of simultaneous activation of all LEDs, fullcolored images can be generated, it is also possible to generate images sequentially, and to expose them on the photo material, that contain the color information respectively only in one primary color.

By means of a, flat light modulator, particularly MMD or LCoS, disposed in the image setter in an advantageous manner, as a component of the image generating unit the images to be generated can be directed in a particularly simple and precise manner in the direction of the exit pupil. With such a flat light modulator (MMMD/LCoS) the image information is then, separated according to primary colors, projected in a pixel-resolved manner sequentially into the zones.

It should be clear from the previous discussion that the method according to the invention and the image setter according to the invention exhibit a plurality of new and inventive characteristics and provide relative to prior art significant advantages.

BRIEF DESCRIPTION OF THE DRAWINGS

Additional advantages and possible design characteristics of the invention are specified in the following description of an embodiment example based on the enclosed figures. It is thereby shown.

WAY(S) OF IMPLEMENTING THE INVENTION

Figure 1:
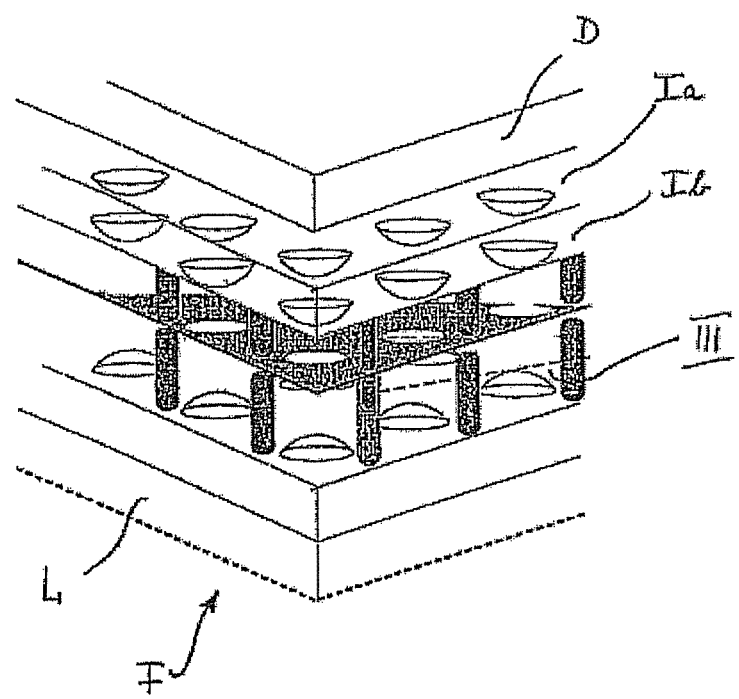
FIG. 1 schematically the construction of a photo material assembled from a plurality of cells, said photo material can be exposed with the method according to the invention and the image setter according to the invention, FIG. 2 schematically the construction of an image setter according to the invention with the different optical components as well as the image ray progression and FIGS. 3 a) and b) the pupil that is movable relative to the image setter or image setter housing in a design implementation according to an embodiment example of the invention in two different views.

In FIG. 1 is shown, for a better understanding of the invention, in principle the construction of a possible photo material F to be exposed with the method according to the invention and the image setter according to the invention. The photo material shown here is suitable and is to be utilized to record three-dimensional images and to render them in three-dimensional effect for viewing purposes. To that effect the photo material F is partitioned into a plurality of zones or cells that are respectively covered over with a lens system and an aperture opening. The photo material consists of a cover layer D, a first meniscus lens layer I laying below that with a concave lens surface Ia) in the front part and a convex lens surface Ib) in the rear, an aperture layer B with zone-wise distributed aperture openings, a second lens layer II beneath the aperture layer B and finally a light sensitive layer L. The individual lenses of the two lens layers, the meniscus lens layer I and the second lens layer II, and the aperture openings of the aperture layer B a arranged in the vertical direction one below the other and thereby define the individual zones or cells in the horizontal distribution of the photo material.

In order to be able to record and render three-dimensional images with such a photo material in a corresponding size, preferably several hundred thousand individual zones formed from respectively one lens of the lens layers I, II as well as one associated aperture from the aperture layer B and a corresponding area of the light-sensitive layer L laying below that are disposed next to each other and have to be imaged. In particular in the context of the exposure with digitally calculated images that can be generated entirely virtual or were however computationally converted because of a natural original into individual images from different observation perspectives or from a plurality of images that were recorded from a natural original individually from different observation positions and subsequently digitized, an image setter has to expose each individual of these cells one after the other with image representations from different observation positions in order to at the end evoke a three-dimensional effect in the observer.

This is implemented according to the invention with an image setter that is moved relative to the photo material F continuously and exposes the individual cells or zones during this motion.

Figure 2:
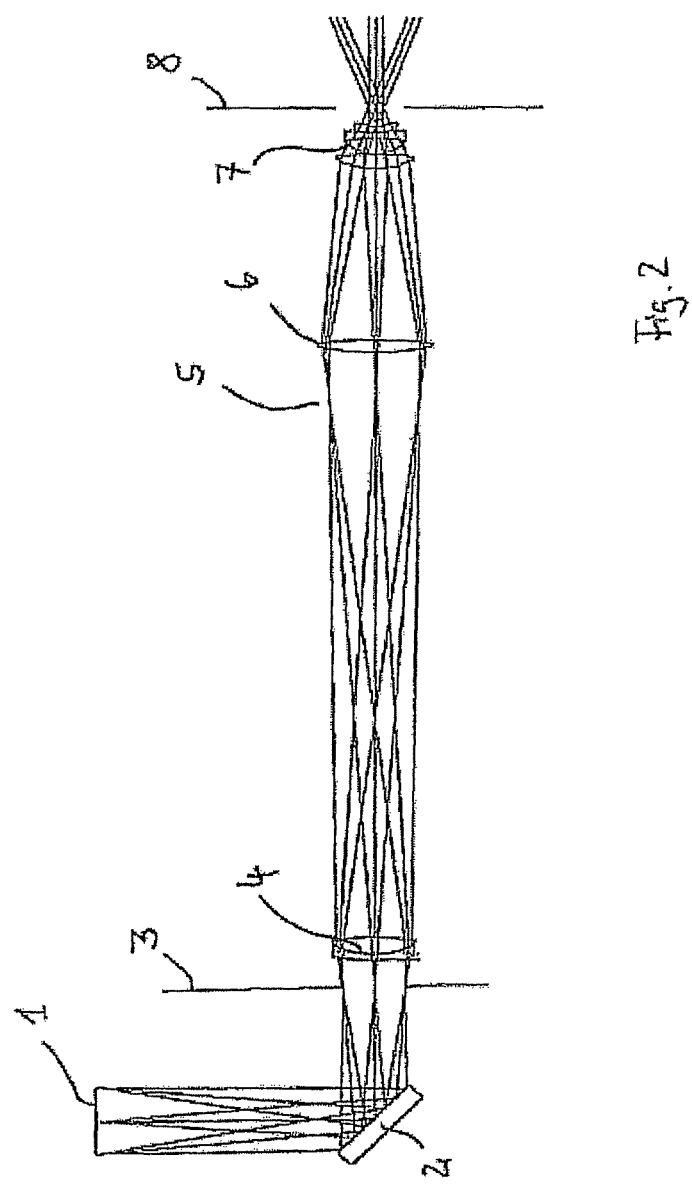

In FIG. 2 schematically the construction of an implementation variation of such an image setter with the most important optical components and the image ray progression is represented. Such an image setter contains an image generating unit 1 that for example can be implemented as an LCD unit on which then already pixel-accurate a color image is generated. Alternatively an LSoS can be disposed here too, whereby here then an illumination with several different color LEDs is required in order to obtain a complete color image. The redirection of the light emanating from the image generating unit 1 in the direction of the projector ray progression is accomplished with the redirection device 2 that can be either a mirror or a beam splitter. By means of the redirection device 2 the light is directed through the pupil 3 onto the object 4. From there the light traverses the intermediate image 5, in which the image generating unit 1 is imaged in focus, further through a field lens 6. Finally the light is guided by means of the projection objective 7 in the direction of the zones or cells to be exposed and forms in 8 the exit pupil as an image of the pupil 3. In the case case of exposure of a photo material from FIG. 1 the plane of the exit pupil 8 so formed lies exactly in the plane of the virtual images of the apertures B imaged by means of the meniscus lens layer I.

The entire arrangement is accommodated in a projector housing that is not shown here and is shunted or moved during the exposure process relative to the photo material F in order to activate and expose individual zones.

Figure 3:
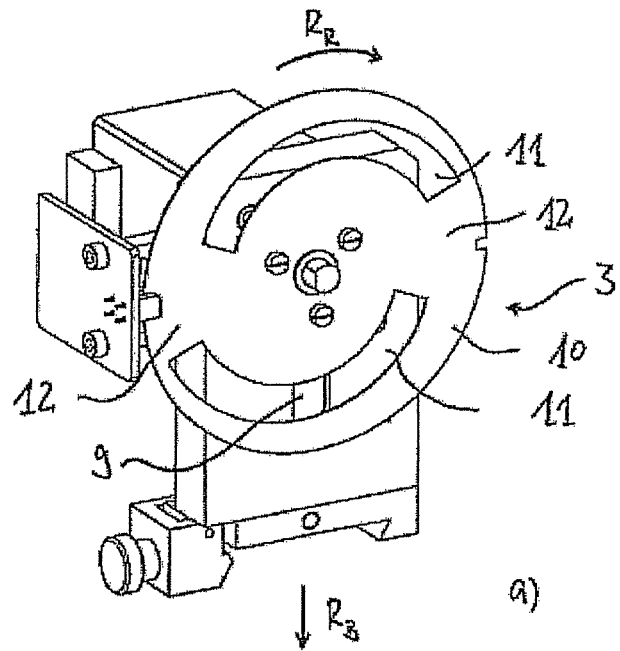
Figure 3:
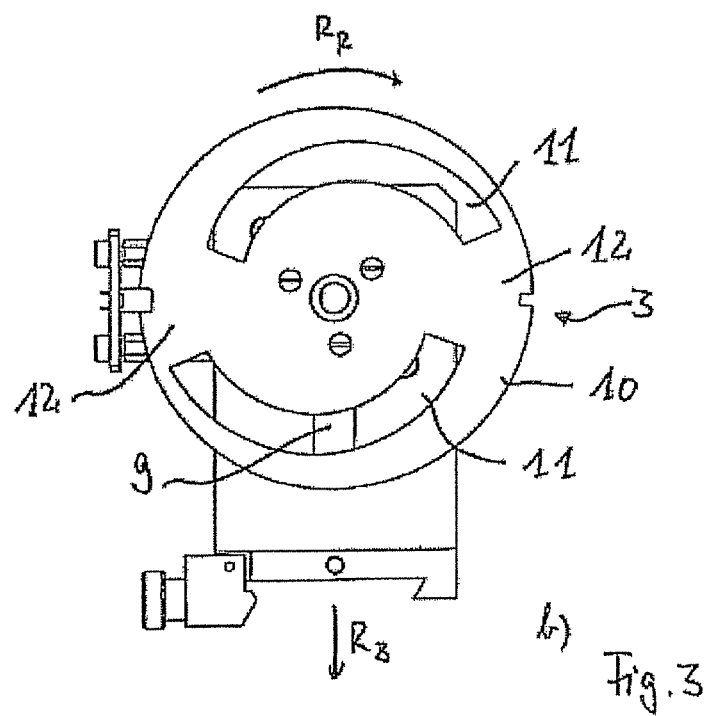

Finally in FIG. 3 two different views are represented (one a three-dimensional view obliquely from the front, FIG. 3a) and a view from the front (FIG. 3b)) in an embodiment example of a possible mechanical variation for the creation of an exit pupil that is movable relative to the housing of the image setter by means of a pupil 3 that lies within the image setter and is imaged toward the outside of the image setter. The pupil 3 is here realized through the overlay of a light entry slot 9 that is formed in a barrier element and that extends in the direction of movement of the image setter relative to the photo material, indicated here with RB, as well as an aperture wheel 10 that is disposed in front of this light entry slot 9 and whose rotation axis lays along the longitudinal axis of the light entry slot 9. The aperture wheel 10 features in this embodiment example two longitudinal openings 11 that extend close to the circumferential direction of the aperture wheel 10, however in a spiral-shaped form starting from a small distance from the edge of the aperture wheel 10 to an area with a larger such distance.

Between the longitudinal openings 11 are closed areas 12 in which the aperture wheel 10 features no openings whatsoever.

During the operation of the embodiment example of an image setter according to the invention discussed here and in the case of a design variation for the implementation of the method according to the invention the aperture wheel 10 is moved in the rotational direction RR in a coordinated manner with the progression velocity in the movement direction RB, whereby, because of the increasing distance of the opening that sweeps across the light entry slot 9 from the edge of the aperture wheel 10, the pupil 3 that is formed by the overlay of these two elements shifts opposite the direction of movement RB, namely through the choice of the relation between the velocity of movement against the direction of movement RB and the rotational velocity in the direction RR in such a manner that its inverted image, the exit pupil 8 remains essentially stationary relative to the surface of the light sensitive material.

The image setter is already moved on by these means relative to the photo sensitive material, even though the exposure with the light that impinges through the exit pupil 8 remains relatively stationary to the photo material. When the opening 11 with its rear-most end, as seen in the rotational direction RR, has swept across the light entry slot 9, a closed are 12 covers this slot so that the pupil 3 is closed. By these means it is prevented that in a transition area between two zones an undesirable double exposure of two zones can take place. During a further rotation of the aperture wheel 10 the next longitudinal opening 11 with its area that is close to the outer edge of the aperture wheel 10 appears above the light entry slot 9 so that the exit pupil 8—as an image of the pupil 3 formed thereby—again impinges on the entrance pupil of the next zone to be exposed and is, through further rotation of the aperture wheel 10, moved on relative to the image setter housing but remains essentially stationary relative to the zone to be exposed.

It should be plausible that by means of this method a quick and continuous movement of the image setter across the photo material to be exposed is possible while at the same time exposing individual zones securely and clearly separated.

It should thereby be also clear that the presented embodiment example does not represent the only possibility to create an exit pupil that shifts relative to a continuously moving image setter. This is also readily possible with an aperture wheel with circularly-shaped or by suitable means otherwise shaped openings that can be equipped with an area for the holes that is angled relative to the wheel plane or a cam, with a punched tape with straight or curved edges, as an oscillating hole aperture with linear drive or a cam shaft drive or other means that are familiar to the person skilled in the art.

LIST OF REFERENCE SYMBOLS

1 Image generation unit
2 Redirection device
3 Pupil
4 Objective for intermediate image
5 Intermediate image
6 Field lens
7 Projection objective
8 Exit pupil
9 Light entry slot
10 Aperture wheel
11 Longitudinal opening
12 Closed area
B Aperture layer RB Movement direction
D Cover layer RR Rotational direction
F Photo material
I a) front lens surface of the first lens layer
I b) rear lens surface of the first lens layer
II second lens layer
L light sensitive layer

The invention claimed is:

1. A method for exposing a photo material comprising a plurality of zones to be exposed with a digitally calculated image by means of an image setter, by movement of which a continuous relative motion is carried out between the photo material and the image setter, and the exposure of the individual zones takes place during said motion; wherein the image setter features in the ray progression of an exposing light ray or ray bundle an exit pupil with an aperture width that corresponds essentially to an entrance pupil of the zones, and that the image setter is continuously moved relative to the photo material across the surface of the same and that the exit pupil is changed in its position relative to the image setter in such a manner that the exit pupil remains essentially stationary in relation to the zone to be exposed during the continuous motion of the image setter relative to the photo material, at least for the duration of an exposure time; and wherein the image setter performs an imaging with exposition light rays that are essentially parallel in the exit pupil, are imaged at infinity and carry the image information.

2. The method according to claim 1, wherein the exit pupil is imaged toward an outside of the image setter, preferably toward an interior of the photo material to be exposed or in the plane of the entrance pupil of the photo material to be exposed.

3. The method according to claim 1, wherein the exposure of each respective zone is accomplished by means of an intensive exposure of short duration with an exposure duration that is shorter than the duration of the relative motion between the image setter and the photo material from a first zone to be exposed to a neighboring second zone to be exposed by a factor of at least 10.

4. The method according to claim 3, wherein the exposure duration is shorter than the duration of the relative motion between the image setter and the photo material from the first zone to be exposed to the neighboring second zone to be exposed by a factor of at least 50 or more.

5. The method according to claim 3, wherein the exposure duration is in the range of a few milliseconds or less.

6. The method according to claim 1, wherein the exit pupil is moved in an essentially linear manner within the image setter at least for the duration of an exposure time.

7. The method according to claim 6, wherein the exit pupil is moved linearly within the image setter in such a manner that during the continuous motion of the image setter no vibrations through imbalances or mass accelerations are transferred to the rest of the image setter.

8. The method according to claim 1, wherein the photo material features a layer of imaging lenses disposed next to one another or an imaging lens system above a light sensitive layer, whereby a zone to be exposed is determined by means of the entrance pupil of the imaging lens or of the imaging lens system.

9. The method according to claim 1, wherein during the exposure process different zones are exposed with images that are generated in the image setter and are digitally calculated with displaced observation positions.

10. The method according to claim 1, wherein during the exposure process neighboring zones are exposed with images that are generated in the image setter and are digitally calculated in respectively one of three primary colors of a color mixing system.

11. The method according to claim 1, wherein during the exposure process one zone after the other is exposed with images that are generated in the image setter and are digitally calculated in respectively one of three primary colors of a color mixing system.

12. The method according to claim 1 wherein the zones are exposed individually, line by line.

* * * * *